United States Patent
Deniau et al.

(10) Patent No.: US 9,499,016 B2
(45) Date of Patent: Nov. 22, 2016

(54) VALVE STEM FOR COUPLING A TPMS WHEEL UNIT TO A WHEEL RIM, TPMS WHEEL UNIT AND VALVE STEM ASSEMBLY AND INSTALLATION THEREOF

(71) Applicant: Continental Automotive Systems, Inc., Auburn Hills, MI (US)

(72) Inventors: Jean-Christophe Deniau, Fenton, MI (US); Martin Jankowski, Macomb, MI (US); Matthew D McIntyre, New Baltimore, MI (US)

(73) Assignee: Continental Automotive Systems, Inc., Auburn Hills, MI (US)

( * ) Notice: Subject to any disclaimer, the term of this patent is extended or adjusted under 35 U.S.C. 154(b) by 254 days.

(21) Appl. No.: 14/145,580

(22) Filed: Dec. 31, 2013

(65) Prior Publication Data
US 2015/0183281 A1     Jul. 2, 2015

(51) Int. Cl.
*B60C 23/04* (2006.01)
*B60C 29/00* (2006.01)
*G01L 17/00* (2006.01)

(52) U.S. Cl.
CPC ......... *B60C 23/0494* (2013.01); *B60C 29/005* (2013.01); *B60C 23/0408* (2013.01); *B60C 23/0496* (2013.01); *G01L 17/00* (2013.01); *Y10T 29/49002* (2015.01)

(58) Field of Classification Search
CPC ......... B60C 23/0496; B60C 23/0408; B60C 23/0494; B60C 29/005; G01L 17/00; Y10T 29/49002
USPC ............... 73/146.8, 146.3, 146.2, 146, 146.5
See application file for complete search history.

(56) References Cited

U.S. PATENT DOCUMENTS

| | | | | |
|---|---|---|---|---|
| 3,258,051 | A * | 6/1966 | Kilmarx | B60C 29/02 152/427 |
| 4,077,456 | A * | 3/1978 | Smith | B60C 29/02 137/223 |
| 7,810,390 | B2 * | 10/2010 | Hettle | B60C 23/0408 73/146.8 |
| 8,381,580 | B2 | 2/2013 | Chuang et al. | |
| 8,511,332 | B2 | 8/2013 | Robert | |
| 2008/0083272 | A1 * | 4/2008 | Katou | B60C 23/0408 73/146.8 |
| 2010/0192682 | A1 * | 8/2010 | Gory | B60C 23/0494 73/146.8 |

FOREIGN PATENT DOCUMENTS

| | | |
|---|---|---|
| JP | 2011251635 A | 12/2011 |
| WO | 2008/151267 A1 | 12/2008 |

OTHER PUBLICATIONS

Search Report dated Aug. 15, 2014, from corresponding GB Patent Application No. GB1401624.0.

* cited by examiner

*Primary Examiner* — Lisa Caputo
*Assistant Examiner* — Nathaniel T Woodward

(57) ABSTRACT

A valve stem for coupling a TPMS wheel unit to a wheel rim, TPMS wheel unit and valve stem assembly and installation thereof are disclosed. The valve stem comprises a bulb, an inner tubular member, and an outer tubular member; the inner tubular member and the outer tubular member being fixedly attached to the bulb.

20 Claims, 3 Drawing Sheets

VALVE STEM FOR COUPLING A TPMS WHEEL UNIT TO A WHEEL RIM, TPMS WHEEL UNIT AND VALVE STEM ASSEMBLY AND INSTALLATION THEREOF

BRIEF DESCRIPTION OF THE DRAWINGS

For a more complete understanding of the disclosure, reference should be made to the following detailed description and accompanying drawings wherein.

Figure 1:
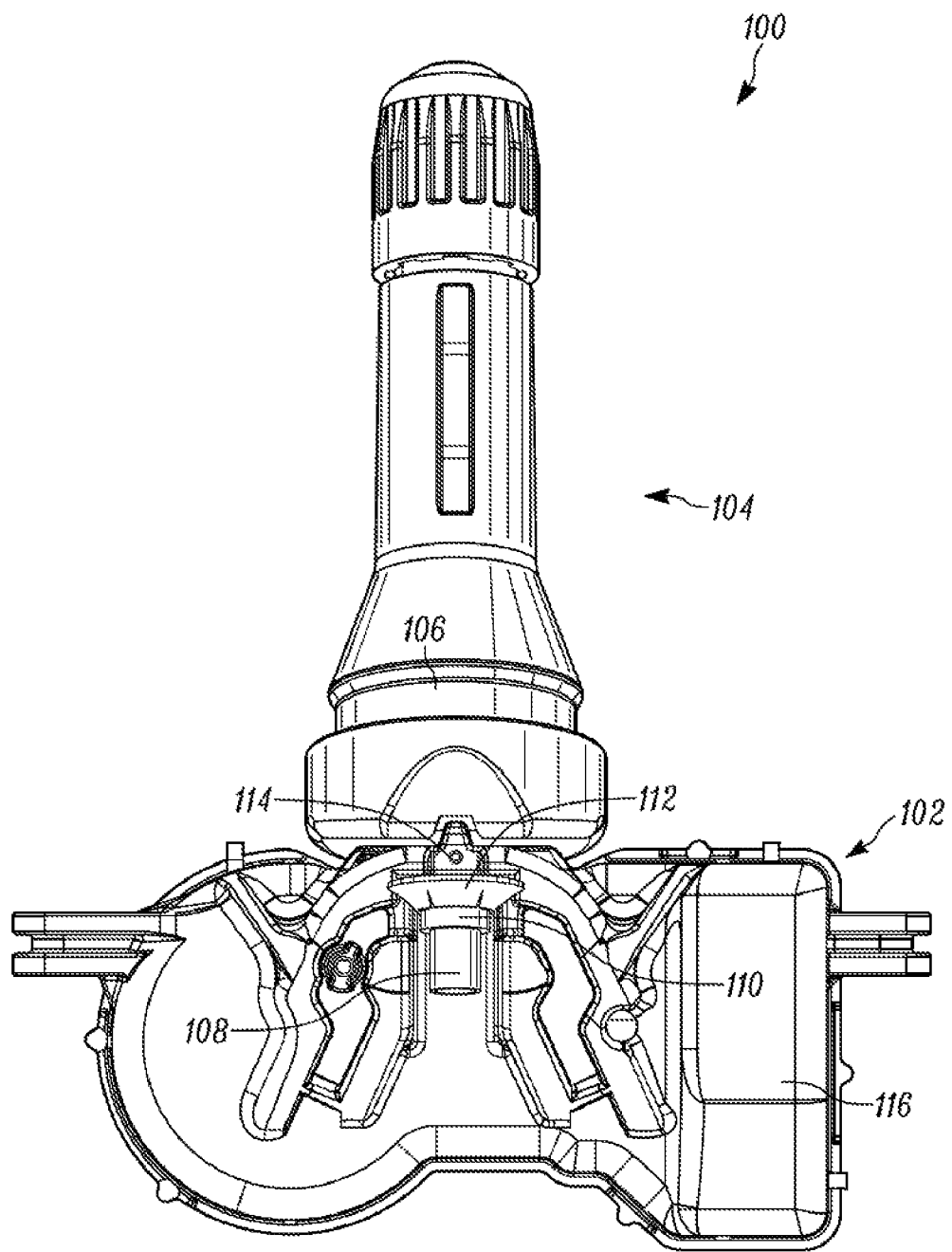
FIG. 1 comprises a schematic pictorial view of an exemplary TPMS wheel unit and valve stem assembly.

Skilled artisans will appreciate that elements in the figures are illustrated for simplicity and clarity and have not necessarily been drawn to scale. For example, the size dimensions and/or relative positioning of some of the elements in the figures may be exaggerated relative to other elements to help to improve understanding of various aspects of the present invention. Also, common but well-understood elements that are useful or necessary in a commercially feasible embodiment are often not depicted in order to facilitate a less obstructed view of these various aspects of the present invention. Furthermore, it will be appreciated that certain actions and/or steps may be described or depicted in a particular order of occurrence while those skilled in the art will understand that such specificity with respect to sequence is not actually required. It will also be understood that the terms and expressions used herein have the ordinary meaning as is accorded to such terms and expressions with respect to their corresponding respective areas of inquiry and study except where specific meanings have otherwise been set forth herein.

DETAILED DESCRIPTION

A number of approaches to monitor the tire pressure and other characteristics of wheels and tires on vehicles are in use today. One of the more popular approaches uses wheel rim mounted Tire Pressure Monitoring System ("TPMS") wheel units. A TPMS wheel unit comprises a sensing and a communication device placed in the inflation cavity of the wheel, the inflation cavity being typically defined by the wheel rim and a tubeless tire. The TPMS wheel unit senses the conditions inside the tire, for example pressure and temperature, and transmits data indicative of the conditions to a TPMS receiver. Upon being received, the data is interpreted to display tire condition related information, for example under-inflation warnings, as needed or desired.

Many of the rim mounted TPMS wheel units are coupled to the rim with valve stems. Some valve stems comprise a rubber bulb partially fixedly covering a rigid, typically metallic, tubular member and are mounted to the rim by pushing or pulling the valve stem partially through the valve hole of the wheel rim so that the bulb straddles the two sides of the rim wall through the valve hole. To facilitate adequate sealing against the rim and retention to the rim the valve hole of the rim is smaller in diameter than some sections of the bulb. Accordingly, when the valve stem is pushed or pulled through the valve hole, the diameter of a section of the valve stem bulb will decrease to conform to and at least partially pass through the valve hole. As the diameter of the valve stem bulb decreases, the length of the valve stem bulb increases, for example due to the Poisson effect. Accordingly, a TPMS wheel unit that is fixedly attached to the valve stem's rigid tube on the side of the bulb's elongation should not be touching the valve stem bulb immediately prior to installation as the TPMS wheel unit risks preventing the bulb from suitably penetrating the rim or causing the TPMS wheel unit to itself be damaged in the installation process.

Some current rubber bulb valve stems for TPMS wheel units are designed to provide a gap between the valve stem bulb and the TPMS wheel unit's housing. This gap allows for stretching of the valve stem bulb during the urging of the valve stem through the valve stem hole with the TPMS wheel unit already attached while reducing the risk of installation related damage to the TPMS wheel unit itself.

However, such approach places the TPMS wheel unit farther away from the rim wall. As the TPMS wheel unit is placed farther from the wheel rim, the center of mass of the TPMS wheel unit and the valve stem assembly often also moves farther away from the wheel rim. As the center of mass of the TPMS wheel unit and valve stem assembly is moved farther away from the wheel rim the maximum safe vehicle operating speed is reduced. This is because, for example, the torques and forces acting on the valve stem are increased or become more unevenly balanced. As the forces and torques at a given speed are increased or become more unevenly balanced the risk and extent of valve stem deformation or dislocation in and about the valve hole increases and thus the risk of tire deflation increases. Because the forces and torques increase at higher speeds and any imbalances are magnified, the maximum safe vehicle operating speed is reduced to remain within acceptable deformation and dislocation limits.

Another approach is to attach or re-attach the TPMS wheel unit to the valve stem after the valve stem has been installed in the valve hole in the rim. This approach allows for no significant gap between the TPMS wheel unit and the valve stem bulb. However, the valve stem and TPMS wheel unit is not installed through the valve hole as one final assembly, which complicates the design and installation.

For example, one design contains a clip that holds the housing linked in place to a roll pin, the roll pin being an extension of the valve stem's inflation tube. The roll pin has notches or teeth to engage with the clip. During sensor mounting on the rim, the clip is pushed inward and the roll pin is pushed toward the rim, thus extending the bulb. When the bulb sufficiently penetrates the rim hole, the roll pin is released and so is the clip. Due to its spring effect, the clip engages up into the roll pin notches, thus locking the housing and the roll pin together. However, because the clip is depressed before or during the installation, the installation is viewed by some as somewhat complicated.

Therefore, an alternative approach to allow the valve stem bulb to be extended during mounting of the valve stem while the valve stem is already assembled with the TPMS wheel unit, the TPMS wheel unit to stay as close as practicable to the rim for better dynamic performance, and the TPMS wheel unit to be firmly connected to the valve stem is desired.

With reference to FIG. 1, in an aspect the approach comprises coupling the TPMS wheel unit 102 to the valve stem 104, the valve stem comprising an elastic mechanism such that it allows a part of the valve stem to travel with respect to the TPMS wheel unit housing 116 to offset the elongation of the valve stem bulb 106.

Figure 3:
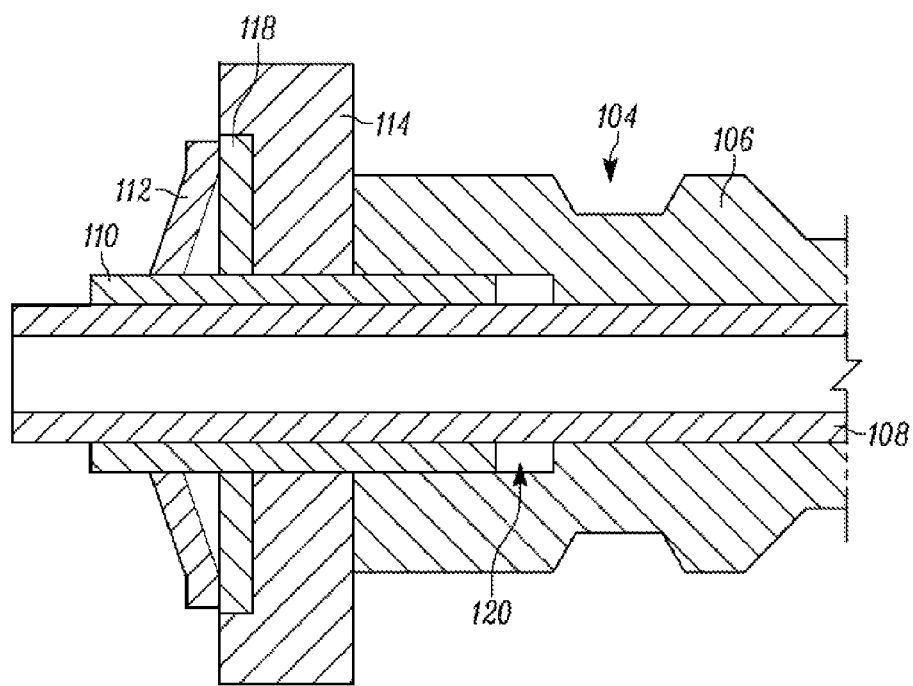
FIG. 3 comprises an axial sectional schematic pictorial view of an alternative exemplary valve stem affixing apparatus in an uncompressed state.

With reference to FIG. 3, the elastic mechanism comprises an inner tubular member 108, an outer tubular member 110, and the bulb 106 defining at least one first void 120. In an example the bulb 106 defines a tubular at least one first void 120. However, in other examples the at least one first void 120 may be of other suitable shapes, for example a bore that does not surround the inner member, a conical void, a convex bore, a concave bore, helical bore, an axial bore, a combination of bores, or otherwise. The inner tubular member 108 and the outer tubular member 110 are fixedly attached to the bulb 106 at their respective interfaces. The inner tubular member 108 and the outer tubular member 110 are in an axially slidable relationship with each other.

Figure 2:
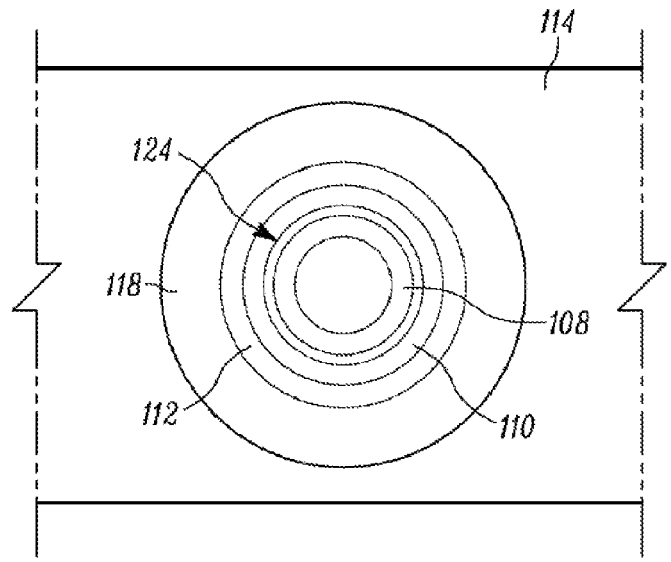
FIG. 2 comprises a transverse sectional schematic pictorial view of an exemplary valve stem affixing apparatus.

With reference to FIG. 2, an optional second void 124 to increase the ease of slidability between the inner tubular member 108 and the outer tubular member 110 is defined by the inner tubular member 108 and the outer tubular member 110. However, the second void 124 is configured to keep in check the degree of play between between the inner tubular member 108 and the outer tubular member 110 in directions other than substantially along the major axis of the valve stem.

With renewed reference to FIG. 3 the outer tubular member 110 is coupled to the wall 114 of the TPMS wheel unit housing 116 with a fastening mechanism 112. In an example the fastening mechanism 112 is a push nut. However, in other examples the fastening mechanism 112 may be any other suitable fastening mechanism, for example a rivet, nut, flange, bulge, adhesive, spring clip, pin, threads, and otherwise, as well as combinations thereof. In some examples the fastening mechanism may couple to the wall through a bracket 118, for example to spread forces exerted by the fastening mechanism or the bulb on the wall 114. Furthermore, in some examples the bracket is comprised in the fastening mechanism, for example if the outer member 110 is threaded, the bracket 118 may comprise a nut configured to engage with the thread on the outer member 110.

Figure 4:
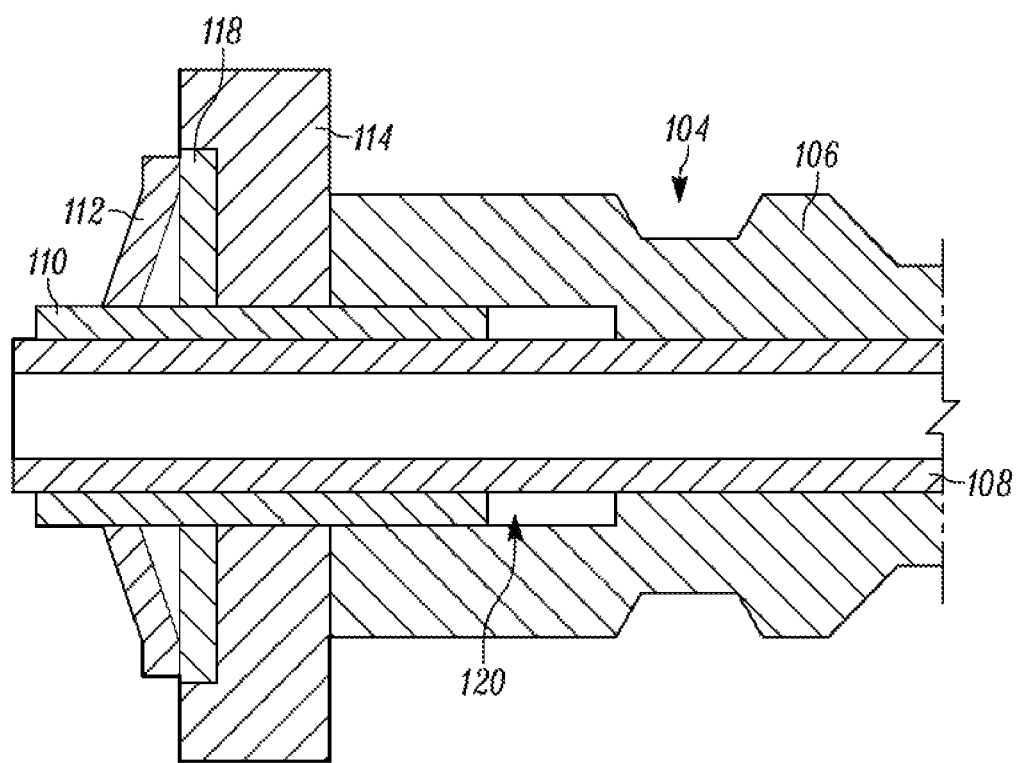
FIG. 4 comprises an axial sectional schematic pictorial view of an alternative exemplary valve stem affixing apparatus in a compressed state.

With reference to FIG. 4 in contrast to FIG. 2, in an aspect the bulb 106 is configured to lengthen in proximity to the at least one first void 120 in response to urging the valve stem 104 through a wheel rim valve hole such that the bulb's 106 diameter is reduced sufficiently to at least partially penetrate the rim through the valve hole. In an example the bulb lengthening causes the at least one first void 120 to lengthen. In an example the bulb lengthening causes the inner tubular member 108 to slide with respect to the outer tubular member 110.

In an aspect, the bulb 106 is configured to, in response to the urging of the valve stem 104 through the wheel rim valve hole, penetrate the rim sufficiently for the bulb 106 to adequately seal against the rim and permanently retain the bulb 106 in the rim. The bulb 106 adequately seals against the rim when the bulb 106 prevents deflation of the tire through the valve hole around the bulb 106 suitably to the vehicle's purpose. The bulb 106 is permanently retained in the rim when the bulb 106 remains inserted into the valve hole suitably to the vehicle's purpose.

In an aspect the assembly 100 is installed into the rim using the following method. A wheel rim defining a valve hole is provided. The assembly 100 comprising the valve stem 104, the TPMS wheel unit 102, the fastening mechanism, the valve stem being coupled to the TPMS wheel unit by the fastening mechanism is provided. The valve stem 104 is urged into the valve hole in the rim so that the bulb 106 lengthens in proximity to the at least one first void 120, the inner tubular member 108 slides with respect to the outer tubular member 110 to accommodate the lengthening of the bulb such that the void 120 lengthens. The valve 104 stem is urged until the bulb 106 penetrates the rim sufficiently for the bulb 106 to adequately seal against the rim and permanently retain the bulb 106 in the rim. The urging is discontinued. The bulb 106 adequately seals against the rim when the bulb 106 prevents deflation of the tire through the valve hole around the bulb 106 suitably to the vehicle's purpose. The bulb 106 is permanently retained in the rim when the bulb 106 remains inserted into the valve hole suitably to the vehicle's purpose.

Those skilled in the art will recognize that a wide variety of modifications, alterations, and combinations can be made with respect to the described embodiments without departing from the spirit and scope of the invention, and that such modifications, alterations, and combinations are to be viewed as being within the scope of the invention. Further, those skilled in the art will recognize that the approaches described herein may also be used to design components and devices other than those listed above.

The invention claimed is:

1. A TPMS assembly comprising:
   a TPMS wheel unit mechanically coupled to a valve stem;
   the valve stem comprising a bulb, an inner tubular member, and an outer tubular member;
   the inner tubular member and the outer tubular member being fixedly attached to the bulb;
   wherein the inner tubular member penetrates both ends of the outer tubular member through a cavity defined by the outer tubular member and wherein an end of the inner tubular member distal from an attachment interface with the bulb extends beyond an end of the outer tubular member and wherein the end of the outer tubular member is configured to receive a fastening mechanism mechanically coupling the TPMS wheel unit to the valve stem and leaving substantially no gap between the bulb and the TPMS wheel unit immediately prior to and during urging of the valve stem into a valve stem hole of a wheel rim.

2. The TPMS assembly as described in claim 1 wherein the bulb defines at least one first void configured to permit the inner tubular member and the outer tubular member to be in an axially slidable relationship with each other.

3. The TPMS assembly as described in claim 2 wherein the bulb is configured to lengthen in response to the valve stem being urged through a vehicle wheel rim valve hole; and
   wherein the bulb lengthening comprises bulb lengthening in proximity to the at least one first void.

4. The TPMS assembly as described in claim 2 wherein the bulb is configured to lengthen in response to the valve stem being urged through a vehicle wheel rim valve hole and the bulb lengthening comprises bulb lengthening in proximity to the at least one first void; and
   wherein the bulb lengthening causes the at least one first void to lengthen.

5. The TPMS assembly as described in claim 1 wherein the bulb is configured to lengthen in response to the valve stem being urged through a vehicle wheel rim valve hole.

6. The TPMS assembly as described in claim 5 wherein the lengthening causes an outside diameter of at least a section of the bulb to decrease sufficiently for the bulb to at least partially penetrate a vehicle wheel rim through a valve hole.

7. The TPMS assembly as described in claim 5 wherein the bulb lengthening causes the outer member to slide with respect to the inner member.

8. A valve stem comprising:
a bulb,
an inner tubular member, and
an outer tubular member;
the inner tubular member and the outer tubular member being fixedly attached to the bulb
wherein the inner tubular member penetrates both ends of the outer tubular member through a cavity defined by the outer tubular member and wherein an end of the inner tubular member distal from an attachment interface with the bulb extends beyond an end of the outer tubular member and wherein the end of the outer tubular member is configured to receive a fastening mechanism mechanically coupling a TPMS wheel unit to the valve stem and leaving substantially no gap between the bulb and the TPMS wheel unit immediately prior to and during urging of the valve stem into a valve stem hole of a wheel rim.

9. The valve stem as described in claim 8 wherein the bulb defines at least one first void configured to permit the inner tubular member and the outer tubular member to be in an axially slidable relationship with each other.

10. The valve stem as described in claim 9 wherein the bulb is configured to lengthen in response to the valve stem being urged through a vehicle wheel rim valve hole; and
wherein the bulb lengthening comprises bulb lengthening in proximity to the at least one first void.

11. The valve stem as described in claim 9 wherein the bulb is configured to lengthen in response to the valve stem being urged through a vehicle wheel rim valve hole; and
wherein the bulb lengthening causes the at least one first void to lengthen.

12. The valve stem as described in claim 8 wherein the bulb is configured to lengthen in response to the valve stem being urged through a vehicle wheel rim valve hole.

13. The valve stem as described in claim 12 wherein the lengthening causes an outside diameter of at least a section of the bulb to decrease sufficiently for the bulb to at least partially penetrate a vehicle wheel rim through a valve hole.

14. The valve stem as described in claim 12 wherein the lengthening causes the outer tubular member to slide with respect to the inner tubular member.

15. A method of installing a TPMS wheel unit and valve stem assembly comprising:
providing a wheel rim defining a valve hole;
providing a TPMS wheel unit mechanically coupled to a valve stem, the valve stem comprising a bulb, an inner tubular member, and an outer tubular member, the inner tubular member and the outer tubular member being fixedly attached to the bulb, wherein the inner tubular member penetrates both ends of the outer tubular member through a cavity defined by the outer tubular member and wherein an end of the inner tubular member distal from an attachment interface with the bulb extends beyond an end of the outer tubular member and wherein the end of the outer tubular member is configured to receive a fastening mechanism mechanically coupling the TPMS wheel unit to the valve stem and leaving substantially no gap between the bulb and the TPMS wheel unit immediately prior to and during urging of the valve stem into a valve stem hole of a wheel rim;
urging the valve stem into the valve hole such that the bulb lengthens.

16. The method as described in claim 15 wherein the bulb defines at least one first void configured to permit the inner tubular member and the outer tubular member to be in an axially slidable relationship with each other; and
wherein the bulb lengthening causes the at least one first void to lengthen.

17. The method as described in claim 15 wherein the bulb lengthening causes the outer member to slide with respect to the inner member.

18. The method as described in claim 15 wherein the lengthening causes an outside diameter of at least a section of the bulb to decrease sufficiently for the bulb to at least partially penetrate a vehicle wheel rim through a valve hole.

19. The method as described in claim 18 wherein the penetrating is sufficient for the bulb to adequately seal against the rim.

20. The method as described in claim 18 wherein the penetrating is sufficient for the bulb to be permanently retained in the rim.

* * * * *